UNITED STATES PATENT OFFICE.

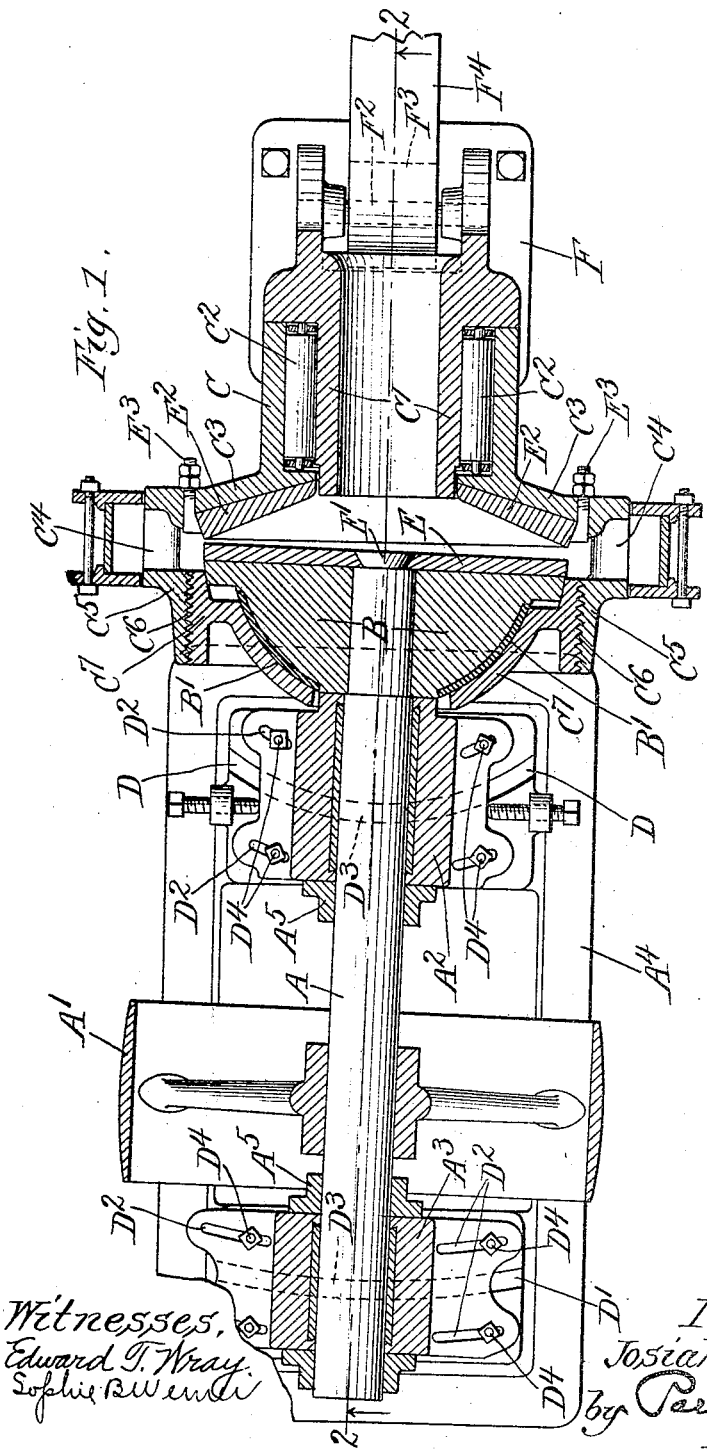

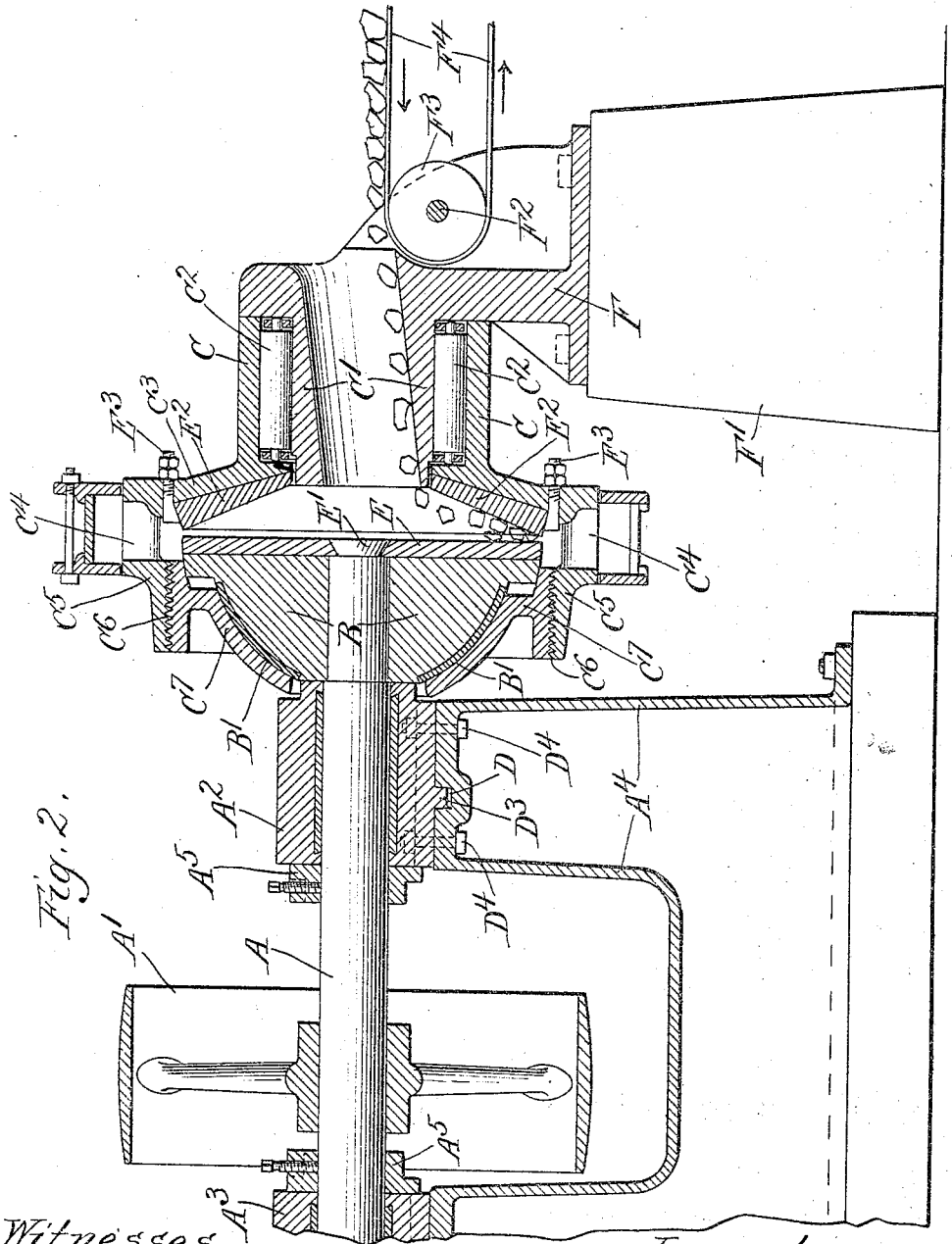

JOSIAH E. SYMONS, OF CHICAGO, ILLINOIS.

CRUSHING-MACHINE.

1,058,114.      Specification of Letters Patent.      Patented Apr. 8, 1913.

Application filed March 23, 1910. Serial No. 551,200.

*To all whom it may concern:*

Be it known that I, JOSIAH E. SYMONS, a citizen of the United States, residing at Chicago, in the county of Cook and State of Illinois, have invented a certain new and useful Improvement in Crushing-Machines, of which the following is a specification.

My invention relates to improvements in crushing machines and is illustrated in the accompanying drawings, wherein—

Figure 1 is a part section on an enlarged scale; Fig. 2 a section along the line 2—2 of Fig. 1.

Like parts are indicated by like letters in both the figures.

The shaft A which carries the driving pulley $A^1$ is mounted in the bearings $A^2$, $A^3$, upon the frame $A^4$, and is held from longitudinal motion therein by the collars $A^5$ and carries at one end the member B, which is provided with the spherical bearing surface $B^1$. The cylinder or hollow shaft C is mounted upon the hollow shaft $C^1$ by means of the roller bearing $C^2$ and has at one end the flange $C^3$ from which project the lugs $C^4$ which carry the collar $C^5$ threaded at $C^6$ to engage the socket $C^7$ which is adapted to engage the spherical surface $B^1$. The frame $A^4$ is provided with the grooves D, $D^1$, and slots $D^2$ concentric with the ball and socket bearing. The bearings $A^2$, $A^3$ are provided with the lugs $D^3$ to engage the slots D, $D^1$. The shaft A may be rotated about the center of the ball and socket bearing to vary the angle which it makes with the shaft $C^1$. When this is done the lugs $D^3$ will ride in the grooves D and the bolts $D^4$ in the slots $D^2$.

The crushing surface E is mounted upon the member B and held thereto by means of the centrally located screw $E^1$. The crushing surface $E^2$ is mounted upon the flange $C^3$ and held thereto by means of the peripherally located bolts $E^3$. The downwardly depending foot F is mounted upon the frame $F^1$, carries the shaft $C^1$ and affords a bearing for the shaft $F^2$ upon which is mounted the pulley $F^3$ which supports the conveyer belt $F^4$, material being fed to the crushing surfaces from the belt through the shaft $C^1$.

It will be evident that while I have illustrated in my drawings an operative form of device, numerous changes could be made in size, shape and arrangement of the parts without departing materially from the spirit of my invention. I wish, therefore, that my drawings be considered to a certain degree as diagrammatic.

The use and operation of my invention are as follows:—In my crushing machine I have two crushing members rotating in opposition one to the other, and mounted on separate shafts. One of these shafts is positively driven, the other is frictionally driven from the first shaft. I provide means for varying the angle of obliquity of the crushing members, these means operative by a bodily angular displacement of one of the shafts. The ball and socket joint connection interposed between the shafts permits this displacement without hindering the driving of the machine. I provide one of the crushing members mounted upon a hollow shaft and means for feeding the material to be crushed through said hollow shaft to the crushing space.

I claim:—

1. A crushing machine comprising two opposed rotating crushing members at an angle one with the other the distance between said members increasing from their peripheries inwardly at all points therealong, one of said crushing members mounted upon a hollow shaft, the other upon a solid shaft, said shafts located upon opposite sides of the crushing members.

2. A crushing machine comprising two opposed rotating crushing members at an angle one with the other, supporting shafts at either side of said members and a ball and socket joint interposed between said shafts.

3. A crushing machine comprising two opposed rotating crushing members one of them provided with a feed opening therethrough and at an angle one with the other and rotating in the same direction, one of said members mounted upon a fixed hollow shaft, the other upon an angularly adjustable shaft, said shafts extending in opposite directions.

4. A crushing machine comprising two opposed rotating crushing members one of them provided with a feed opening therethrough and at an angle one with the other, and rotating in the same direction, one of said members mounted upon a hollow shaft, the other upon an angularly adjustable shaft, said shafts extending in opposite directions.

5. A crushing machine comprising two opposed rotating crushing members at an angle one with the other, one of said members mounted upon a fixed hollow shaft, the other upon an angularly movable shaft, said shafts extending in opposite directions and a ball and socket joint interposed between said shafts.

6. A crushing machine comprising two opposed rotating crushing members at an angle one with the other, one of said crushing members mounted upon a hollow shaft, the other upon an angularly movable shaft, said shafts extending in opposite directions, and a ball and socket connection between said shafts.

7. A crushing machine comprising two opposed rotating crushing members at an angle one with the other, one of said members mounted upon a fixed hollow shaft, an angularly adjustable shaft supporting the other crushing member, a ball and socket joint interposed between said shafts, said adjustable shaft adapted to be angularly adjustable about said ball and socket connection.

8. A crushing machine comprising two opposed rotating crushing members at an angle one with the other, one of said members mounted upon a fixed shaft, an angularly adjustable shaft supporting the other crushing member, and a ball and socket joint interposed between said shafts, said adjustable shaft adapted to be angularly adjustable about said ball and socket connection.

9. A crushing machine comprising two opposed rotating crushing members at an angle one with the other the distance between said members increasing from their peripheries inwardly at all points therealong, one of said members mounted upon a fixed shaft, the other upon an angularly movable shaft, said shafts extending in opposite directions.

10. A crushing machine comprising two opposed rotating crushing members at an angle one with the other, one of said members mounted upon a fixed shaft, the other upon an angularly movable shaft, said shafts extending in opposite directions, and a ball and socket joint interposed between said shafts.

11. A crushing machine comprising two opposed rotating crushing members at an angle one with the other, one of said members mounted upon a fixed shaft, an angularly adjustable shaft supporting the other crushing member, a ball and socket joint interposed between said shafts, said adjustable shaft adapted to be angularly adjustable about said ball and socket connection and means for feeding material to be crushed through said fixed shaft.

12. A crushing machine comprising two disks at an angle one with the other the distance between said members increasing from their peripheries inwardly at all points therealong, a shaft upon which each of said disks is mounted, means for varying the angle between said shafts, said disks located between said shafts.

13. A crushing machine comprising two disks at an angle one with the other the distance between said members increasing from their peripheries inwardly at all points therealong, two shafts, one of said shafts hollow and communicating with the crushing zone.

14. A crushing machine comprising two disks at an angle one with the other, two shafts, one of said shafts hollow and communicating with the crushing zone, and a ball and socket joint interposed between said shafts.

15. A crushing machine comprising two disks at an angle one with the other, two shafts, one of said shafts hollow and communicating with the crushing zone, and a ball and socket joint between said shafts, said ball and socket joint located between one of said shafts and the crushing disks.

16. In a crushing machine two disks adapted to rotate in the same direction and progressively recede from and approach each other at one point along their periphery, one of said disks having a flat surface and one of them provided with a feed perforation therethrough.

17. A crushing machine comprising two crushing members rotating in opposition to each other, two shafts one upon either side of said members, a ball and socket joint interposed between said shafts, said members located between one of said shafts and the ball and socket joint.

18. A crushing machine comprising two crushing members at an angle one with the other, one of said members having a flat crushing surface, the other a dish-shaped surface.

19. A crushing machine comprising two crushing members inclined one to the other, one of said members having a flat crushing surface, the other a dish-shaped surface, and means for rotating them in unison to cause them to progressively approach and recede toward and from each other and one of them provided with a feed perforation therethrough.

20. A crushing machine comprising two crushing members inclined one to the other, and adapted to crush the material between them when it is in contact with their opposed surfaces, a free crushing chamber between them and means comprising a hollow shaft upon which one of said members is mounted for feeding material to be crushed to said chamber.

21. A crushing machine comprising two opposed crushing members inclined to each other, the distance between said members increasing from their peripheries inwardly, and feeding means for said machine operative through one of said members, said means including a shaft, said members rotating in the same direction.

22. A crushing machine comprising two opposed rotating crushing members angularly adjustable one to the other the distance between said members increasing from their peripheries inwardly, and feeding means operative through one of said members.

23. A crushing machine comprising two opposed rotating crushing members at an angle one with the other, shafts at either side of said members, a ball and socket joint interposed between said shafts, means for adjusting the angularity of said shafts comprising bearings wherein one of said shafts is mounted, a support for said bearing, a lug upon said bearing, and a groove in said support concentric with the ball and socket joint in which said lug rides.

24. A crushing machine comprising a shaft, a member having a hemispherical surface mounted on said shaft, a hollow shaft in opposition to said shaft, a connection between said hollow shaft and said hemispherical surface, a crushing surface mounted upon said hemispherical surface and a crushing surface mounted upon said hollow shaft.

25. A crushing machine comprising two opposed crushing members at an angle one with the other the distance between said members increasing from their peripheries inwardly, one of said crushing members mounted upon a hollow shaft, the other upon a solid shaft, said shafts located upon opposite sides of the crushing members one of said members being dish-shaped.

26. A crushing machine comprising a plurality of opposed rotating crushing members, the distance between them increasing from their peripheries inwardly, said members inclined one to the other, shafts upon which they are mounted projecting in opposite directions, and means for varying the distance between said members.

27. A crushing machine comprising a fixed rotatable shaft, a flat crushing member carried thereby, a dish-shaped crushing member in opposition thereto and a ball and socket connection between said members, a hollow shaft supporting said dish-shaped member.

28. A crushing machine comprising a fixed rotatable shaft, a flat crushing member carried thereby, a dish-shaped crushing member in opposition thereto and a ball and socket connection between said members, a hollow shaft supporting said dish-shaped member, and a fixed shaft upon which said shaft rotates and a ball and socket joint interposed between said supporting shafts.

29. A crushing machine comprising two opposed rotating disk-like crushing members at an angle to each other and with an open crushing chamber between them, two opposed shafts extending in opposite directions and upon which the disks are respectively mounted, one of said disks provided with a feed aperture therethrough.

JOSIAH E. SYMONS.

Witnesses:
FRANCIS W. PARKER, Jr.,
SOPHIE B. WIMER.